United States Patent [19]

Tilley

[11] Patent Number: 5,690,461
[45] Date of Patent: Nov. 25, 1997

[54] BIG HAY BALE STACKER AND METHOD

[76] Inventor: Martin C. Tilley, 3003 N. 4025 E., Hansen, Id. 83334

[21] Appl. No.: 772,308

[22] Filed: Dec. 23, 1996

Related U.S. Application Data

[63] Continuation of Ser. No. 441,839, May 16, 1995, abandoned.

[51] Int. Cl.$^6$ ................................................. B65G 57/32
[52] U.S. Cl. ......................... 414/111; 414/501; 414/551; 414/789.7
[58] Field of Search ......................... 414/111, 486, 414/489, 501, 551, 553, 555, 679, 789.7

[56] References Cited

U.S. PATENT DOCUMENTS

| | | | |
|---|---|---|---|
| 3,289,859 | 12/1966 | Tarbox | 414/789.7 X |
| 3,487,955 | 1/1970 | Brown . | |
| 3,521,762 | 7/1970 | Walters . | |
| 3,534,878 | 10/1970 | Monroe | 414/486 X |
| 3,549,023 | 12/1970 | Backman . | |
| 3,583,578 | 6/1971 | Fachini et al. | 414/789.7 X |
| 3,638,808 | 2/1972 | Grey et al. . | |
| 3,662,900 | 5/1972 | Grey et al. . | |
| 3,720,052 | 3/1973 | Anderson et al. | 56/346 |
| 3,788,495 | 1/1974 | Fachini et al. . | |
| 3,941,265 | 3/1976 | Nunnally, Jr. . | |
| 4,047,628 | 9/1977 | Havens | 414/789.7 X |
| 4,261,676 | 4/1981 | Balling, Sr. | 414/24.5 |
| 4,329,101 | 5/1982 | Green et al. | 414/24.5 |
| 4,498,829 | 2/1985 | Spikes | 414/24.5 |
| 4,634,336 | 1/1987 | Pearce | 414/501 X |
| 4,952,111 | 8/1990 | Callahan | 414/111 |
| 4,971,504 | 11/1990 | Klompien | 414/789.7 X |
| 5,211,345 | 5/1993 | Siebenga | 241/101.7 |
| 5,333,981 | 8/1994 | Pronovost et al. | 414/789.7 X |
| 5,397,208 | 3/1995 | Siebenga | 414/111 |
| 5,405,229 | 4/1995 | Tilley et al. | 414/789.7 X |
| 5,507,612 | 4/1996 | Siebenga | 414/111 |

FOREIGN PATENT DOCUMENTS

| | | |
|---|---|---|
| 2083790 | 3/1982 | United Kingdom . |
| 2203119 | 10/1988 | United Kingdom . |

*Primary Examiner*—James W. Keenan
*Attorney, Agent, or Firm*—Ken J. Pedersen; Barbara S. Pedersen

[57] ABSTRACT

Embodiments of a big hay bale stacker apparatus and method are shown and described. The big hay bale stacker picks up a first big hay bale cross-wise, rotates the first bale 90° about an axis parallel to the long dimension of the bale, and lifts the bale and places it on the front edge of a load table. The load table rotates to tip backwards so the first bale slides to the back of the load table when the pick-up mechanism releases the bale. The load table continues to rotate and tip backwards until it also has rotated 90°, and, by doing so, it rotates the first bale another 90° and positions it on the front edge of a load bed. The load table and pick-up mechanism then reverse their travel, and in like fashion as for the first bale, pick up a second bale. The pick-up mechanism does not release the second bale until the load table has rotated 90°, resulting in the second bale being placed on top of the first bale on the front edge of the load bed to create a two-bale set of the first and second bales. A bale-set moving mechanism then slides the two-bale set across the load bed from the front edge towards the back, leaving space at the front edge of the load bed for another two-bale set. This process may be repeated to fill the load bed with two-bale sets, the latter sets pushing the earlier sets towards the back of the load bed until the bed is full. Then, the full load bed may itself be tipped backward to unload a stack of bales that is one bale wide, two bales deep, and as high as the number of two-bales sets loaded on the bed.

1 Claim, 7 Drawing Sheets

BIG HAY BALE STACKER AND METHOD

This application is a continuation of application Ser. No. 08/441,839, filed May 16, 1995, now abandoned.

BACKGROUND OF THE INVENTION

1. Field of the Invention

The present invention relates to the field of hay harvesting, and more particularly to an apparatus and method for picking up, loading and stacking big hay bales on a big-bale stacker bed.

2. Related Art

To obtain the maximum production from a field of hay, each crop of hay must be promptly cut, baled and removed from the field. The more quickly hay can be cut and removed, the more quickly a successive crop of hay can be cultivated.

The harvesting of hay involves three main tasks: cutting the hay; baling the hay; and removing and storing the baled hay in stacks. Although originally manual tasks, nowadays these tasks to a great extent have been mechanized. Of these three tasks, the removing and stacking of the hale bales has heretofore been the most cumbersome.

The difficulties involved in removing and stacking hay bales are to a great extent dependant on the size and quantity of the individual bales produced by the specific hay bailer that is used. Until recently, hay balers have come in three common sizes, producing the following sizes of bales: (1) 14" by 16" by 3 or 4 feet long; (2) 16" by 18" by 3 or 4 feet long; and (3) 16" by 24" by 4 feet long. These three sizes, collectively, fall into the category of "small bales". More recently, balers capable of producing bales 8 feet in length and having cross sections of 2 by 3 feet, 3 by 4 feet, or 4 by 4 feet, known as "big bales", have been produced. The larger bales mean less time is spent gathering, stacking and moving the bales. The primary factor limiting the use of "big bale" balers is the lack of effective machines designed to pick up, transport, stack and retrieve the big bales.

The most common prior art method for moving big bales from the field to a storage area is to use a tractor with a front end loader for loading the bales on a flatbed truck or trailer. Such a method is time consuming and requires at least two operators, i.e., one for each piece of equipment.

U.S. Pat. No. 3,487,955, issued to E. L. Brown, discloses a hay bale stacker trailered behind a baler which has a deck pivotally mounted on a castered chassis between a horizontal loading position and a vertical or discharge stacking position. Sales coming from the baler one at a time to a front corner of the deck are counted and pushed laterally across the deck to form a row of horizontal bales which are pivoted to vertical positions by tines, and then the tines are moved rearwardly by a carriage to move the row of vertical bales on-end rearwardly a distance at least one bale thickness. Each newly-formed row of vertical bales pushes previously-formed rows of vertical bales back farther on the deck until the desired number of rows of vertical bales is formed. Then, a cylinder drive pivots the deck to swing the rows of bales to horizontal positions to form a vertical stack on unloading tines at the rear end of the deck which are then slid out from under the stack to leave it on the ground. The deck is then pivoted back to its horizontal position and the stack-forming operation is repeated.

U.S. Pat. No. 3,521,762, issued to J. C. Walters, discloses a method of loading and orienting bales on a stacker which includes the steps of receiving a bale from a stacker; rotating the bale for orientation; utilizing a first fence to move bales to a lateral location; utilizing a second fence to move the bales rearwardly onto a transfer bed; and then swinging the transfer bed up to deposit the bales onto a stacker bed.

U.S. Pat. No. 3,549,023, issued to E. Backman, also discloses a method of loading and orienting bales on a stacker. The Backman method includes the steps of lifting a bale onto a receiving table; rotating the table to orient the bale into a lengthwise position; dumping the bale onto an elevator; raising the bale or bales into position before a vertical turntable (rotatable about a horizontal axis); grasping the bales by grasp means for holding the bales onto the vertical turntable; rotating the bales as desired; and displacing the turntable along a track for depositing the bales onto a stacker bed.

U.S. Pat. No. 3,788,495, issued to Fachini et al, discloses a bale stacking method which includes the steps of picking up a first plurality of bales, placing them horizontally on an accumulator table in an orientation which is perpendicular to a stacker or load bed, pivoting the accumulator table ninety degrees about a horizontal axis to deposit the second plurality of bales on the stacker bed at right angles relative to and in abutment with the first plurality of bales to form a second tier of bales (see column 9, line 15 et seq.). The bales are individually placed on the accumulator table in the desired orientation via steps performed by the bale transfer mechanism described at column 3, line 39 et seq.

U.S. Pat. No. 4,329,101, issued to A. Green et al, shows an apparatus for picking up round bales and for moving the bales laterally or rearwardly, once on the stacker bed.

U.S. Pat. No. 4,952,111, issued to D. Callahan, discloses a stacking device which picks up large bales cross-wise rather than lengthwise, i.e., across an 8 foot span for proper placement directly on the stacker bed.

U.S. Pat. 5,211,345, issued to C. Siebenga, discloses a front-loading towed device which picks up large bales cross-wise, rotates them 120° about an axis parallel to the long dimension of the picked-up bale, and slides them down an inclined bed to load them there. The pick-up mechanism is a set of loading forks which pivot about a horizontal axis perpendicular to the direction of the travel of the device near the leading edge of the load bed.

SUMMARY OF THE INVENTION

The present invention is a big hay bale stacker apparatus which picks up a first big hay bale cross-wise, i.e. across its longest dimension, rotates the first bale 90° about an axis parallel to the longest dimension, and lifts the first bale and places it on the front edge of a load table. The load table rotates to tip upwards and backwards so the first bale slides to the back of the load table when the pick-up mechanism releases the bale. The load table continues to rotate and tip upwards and backwards until it also has rotated 90°, and by doing so it rotates the first bale another 90° and positions it on the front edge of a load bed.

Then, the load table and pick-up mechanism reverse their travel, and in like fashion for the first bale, pick up a second bale. With the second bale, however, the pick-up mechanism does not release it until the load table has rotated 90°, resulting in the second bale being placed on top of the first bale on the front edge of the load bed in a two-bale set.

Then, a bale-set moving mechanism slides the two-bale set across the load bed from the front edge towards the back, leaving space at the front edge of the load bed for receiving another two-bale set. When this process for the first set is repeated, the load bed becomes filled with two-bale sets, the latter sets pushing the earlier sets towards the back of the load bed until the bed is full. Then, the full load bed may itself be tipped backward to unload a stack of bales that is one bale wide, two bales deep, and as high as the number of two-bales sets loaded on the bed.

The present invention is also a method of loading big hay bales according to the above description for the bale stacker apparatus.

BRIEF DESCRIPTION OF THE DRAWINGS

In FIG. 1, a first bale on the ground has been engaged cross-wise by the pick-up mechanism.

In FIG. 2, the pick-up mechanism has rotated 90° about an axis parallel to the long dimension of the bale, to rotate the first bale 90°, and to place the bale on the front edge of a load table.

In FIG. 3, the load table has rotated upwardly and backwardly about a horizontal axis perpendicular to the direction of travel of the bale stacker, to tip the load table backwards.

In FIG. 4, the pick-up mechanism has released the first bale, which allows the bale to slide down to the back of the load table.

In FIG. 5, the load table has completed its rotation to 90°, resulting in another, or second, 90° rotation of the first bale, which places it onto the front edge of a load bed.

In FIG. 6, the load table and pick-up mechanism have reversed their travel, the pick-up mechanism has engaged and picked up a second bale from the ground, and in like fashion as for the first bale, both the pick-up mechanism and the load table have rotated 90°, except the pick-up mechanism does not release the second bale until the second bale has been placed on top of the first bale, resulting in a two-bale set being made at the front edge of the load bed.

In FIG. 7, a bale-set moving mechanism slides the two-bale set across the load bed from the front edge toward the back.

DESCRIPTION OF THE PREFERRED EMBODIMENTS

Figure 1:
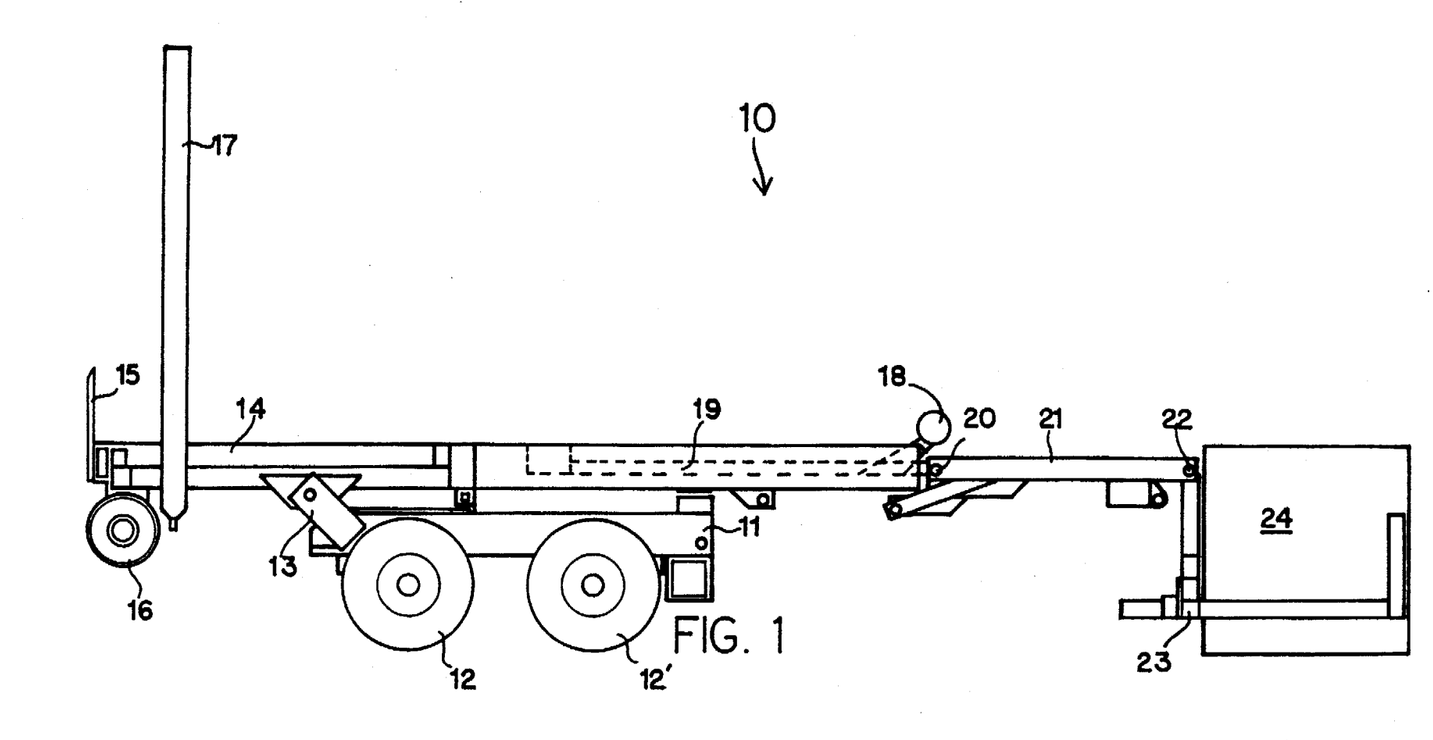
FIGS. 1–7 are sequential, side views of an embodiment of the bale stacker of this invention in operation to load a first two-bale set on the load bed.
Figure 2:
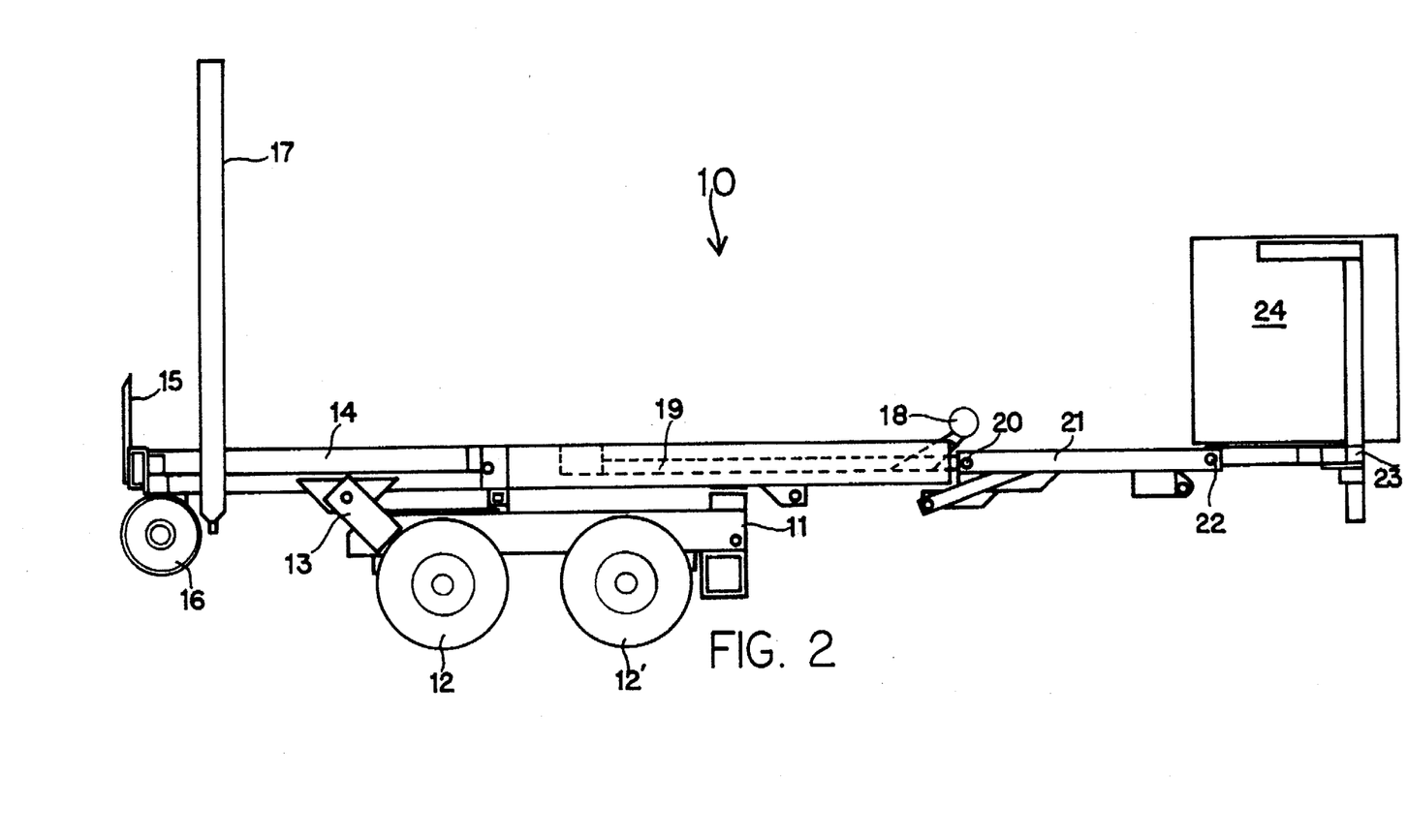
Figure 3:
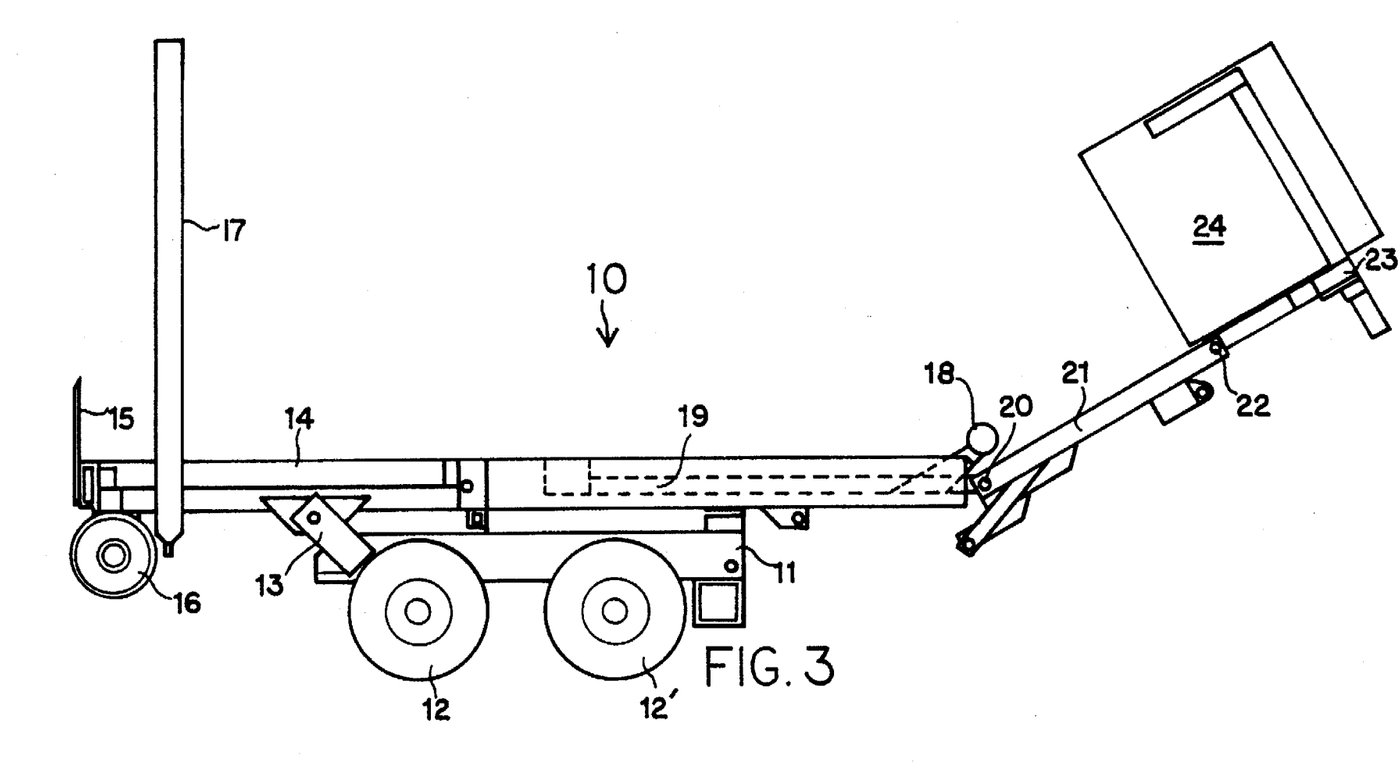
Figure 4:
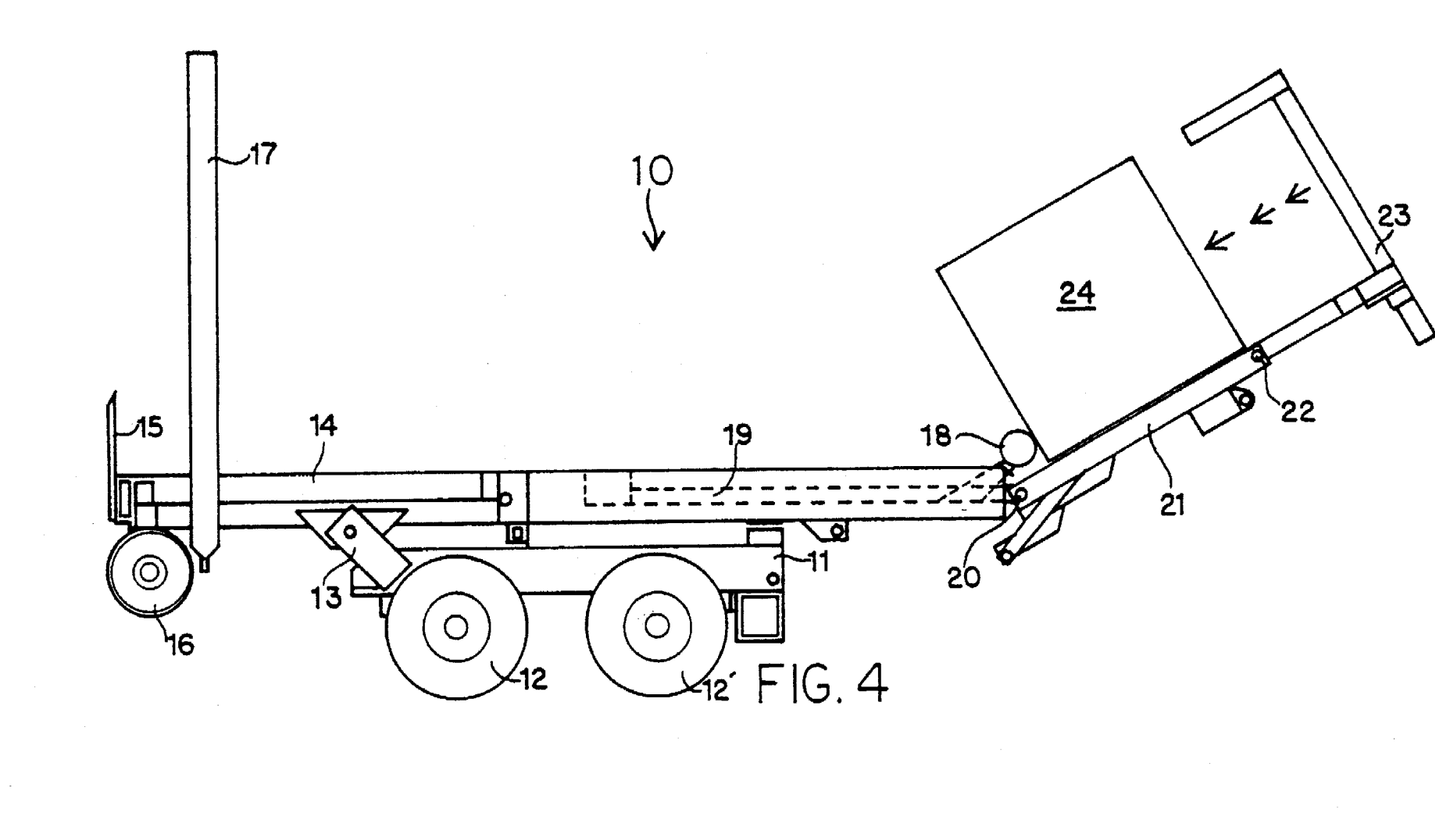
Figure 5:
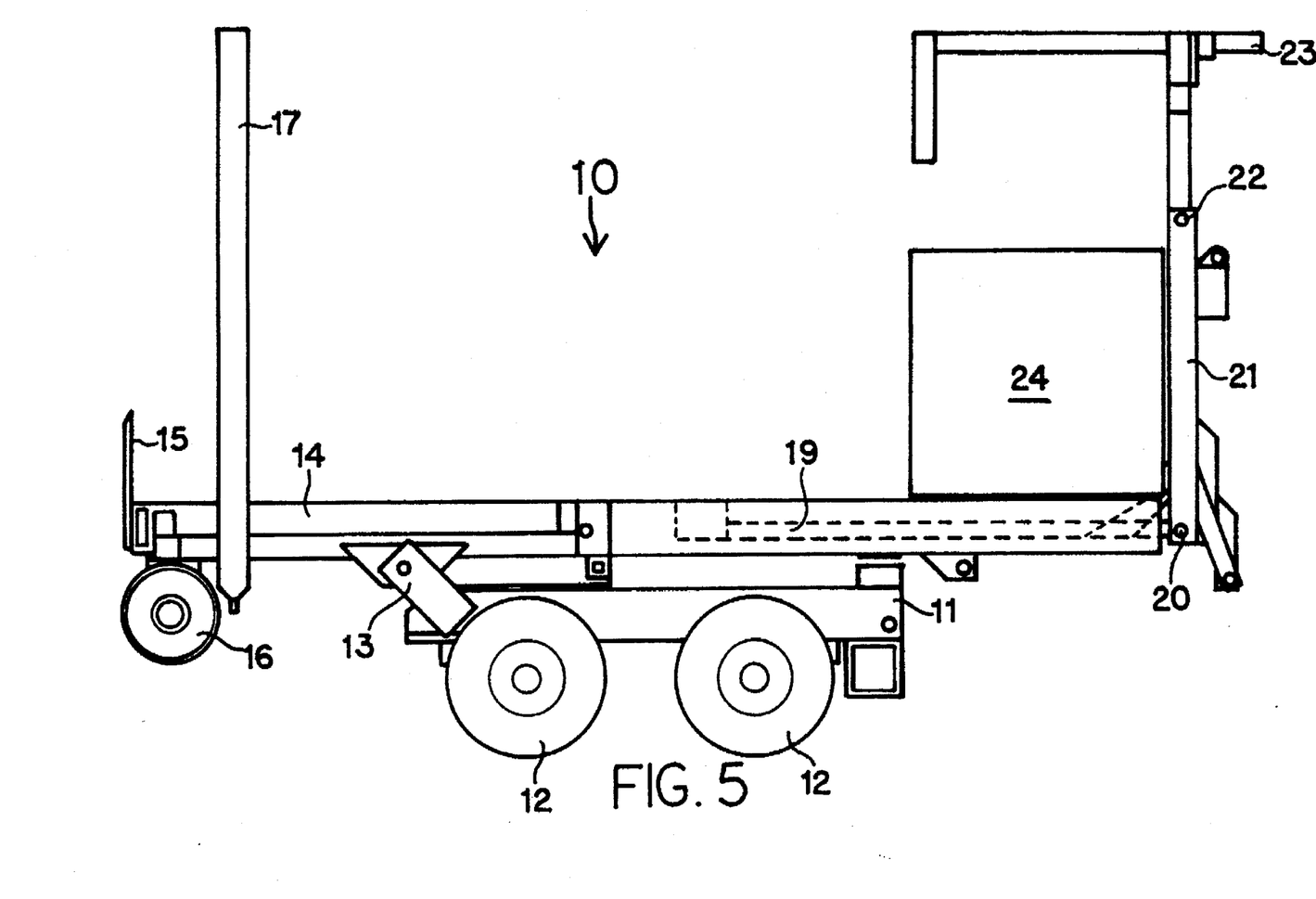

Referring to FIG. 1, there is depicted generally a hay bale stacker 10. Stacker 10 has frame 11 supported by wheels and axles 12 and 12' for moving the stacker over the ground. The stacker 10 has a direction of travel from left to right in FIG. 1. The stacker 10 may be towed behind a tractor, for example, with an offset tongue and hitch which am known in the industry. Pivotally connected to frame 11 at hinge 13 is load bed 14. At its back end (to the left in the Figure), load bed 14 has bale stop 15 and roller 16. Bale stop 15 prevents bales moved to the back of the load bed from falling off the back of the bed. Roller 16 assists the load bed 14 in rolling over the ground when the load bed is tipped backwards to unload a load of bales. Also, near the back end of load bed 14 is a set of bale guides 17 which assist in keeping the bales loaded on the bed straight and from falling off the side of the bed.

Near the front end of load bed 14 (to the right in the Figure) is bale-set moving mechanism 18. In the pictured embodiment, bale-set moving mechanism 18 is a horizontal cylindrical bar, perpendicular to the direction of travel of the stacker, and connected to a pull chain or cable in channel 19 in the center of load bed 14. This way, bale-set moving mechanism 18 may be pulled by the chain or cable, and moved across the load bed 14 from the front towards the back, moving bales on the load bed in back of it (towards the left in the Figure).

At the front edge of load bed 14 is pivotal bed-table connection 20, between the front edge of load bed 14 and the back edge of load table 21. This way, load table 21 may rotate relative to load bed 14, from parallel to perpendicular to and above the bed.

At the front edge of load table 21 is pivotal table-pick-up connection 22, between the front edge of load table 21 and the top end of pick-up mechanism 23. This way, pickup mechanism 23 may rotate relative to load table 21, from perpendicular to parallel to the table. First bale 24 is shown in FIG. 1 engaged by pick-up mechanism 23.

Figure 6:
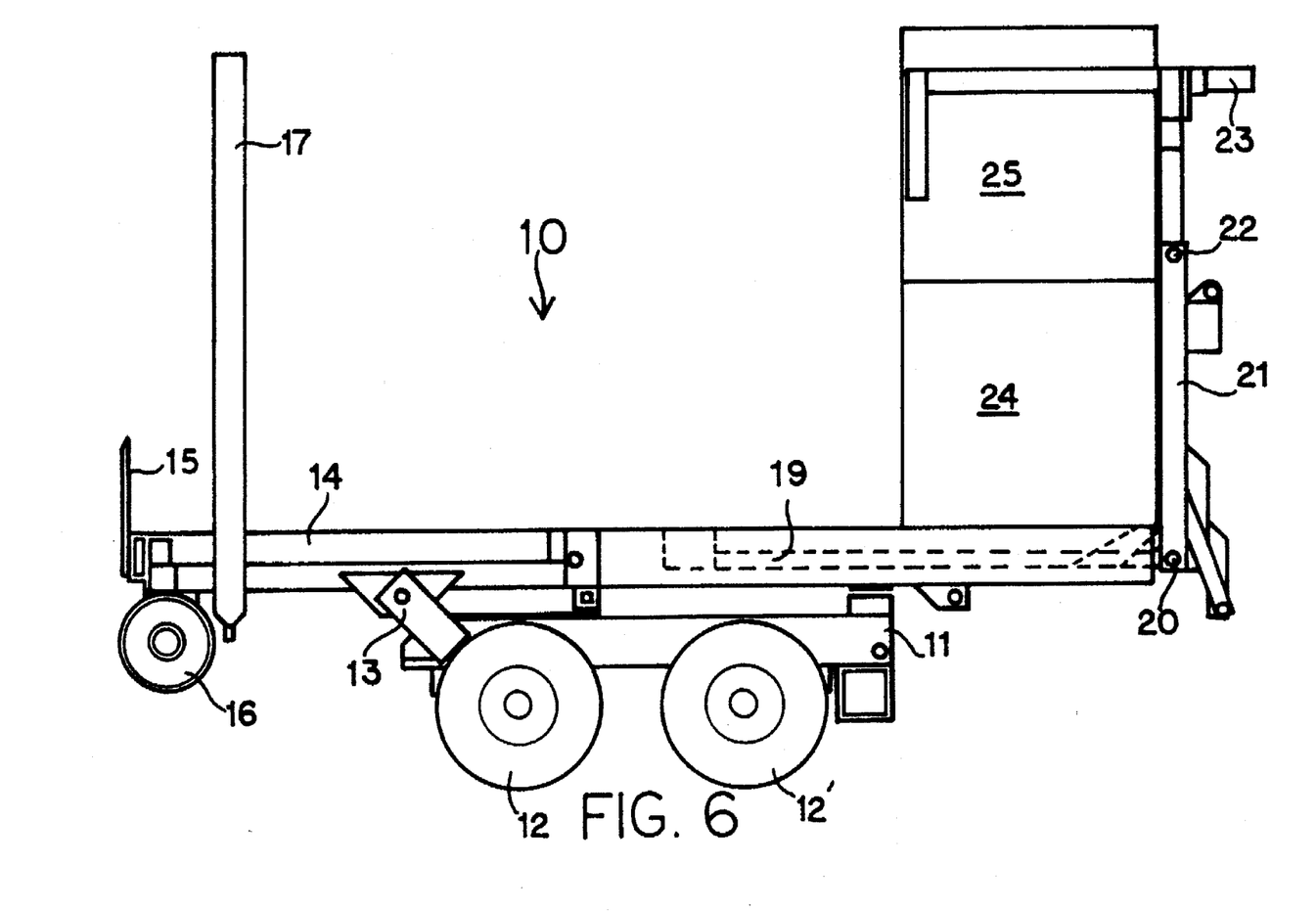
Figure 7:
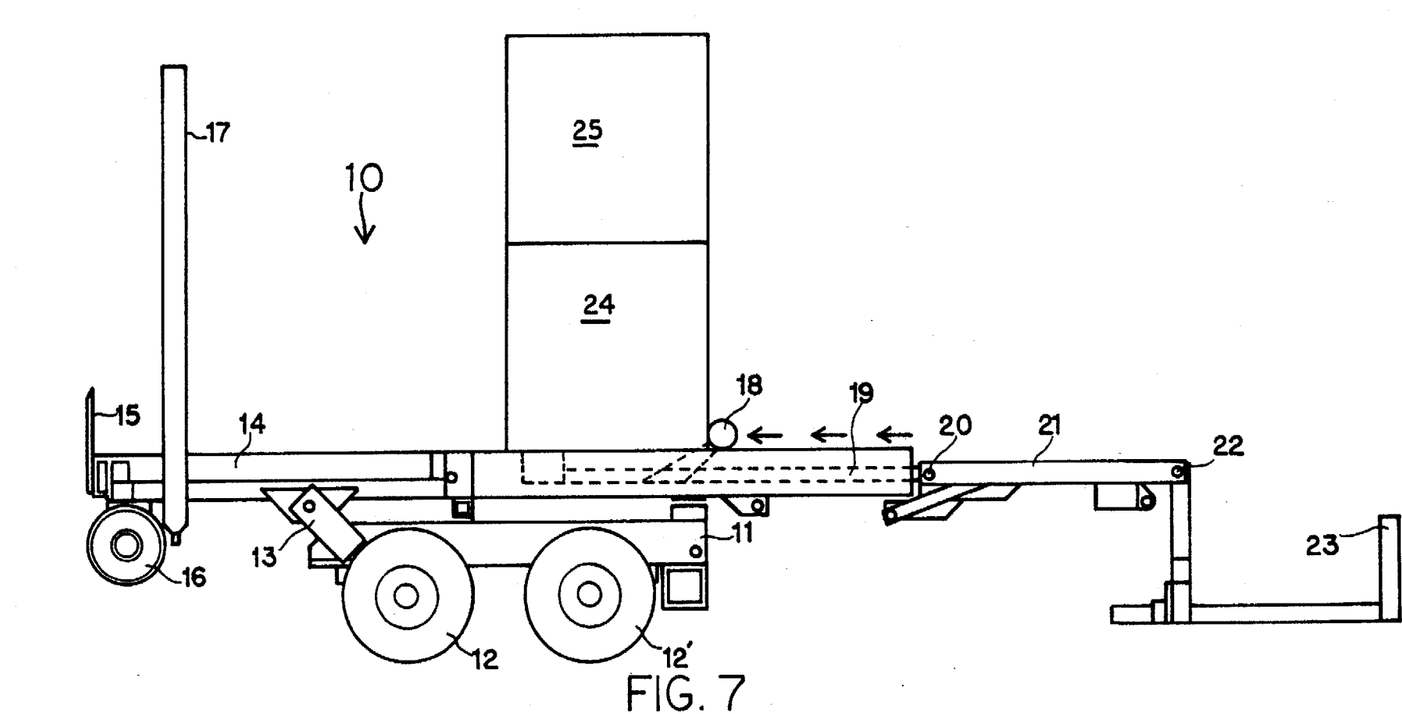

Second bale 25 is shown stacked on top of first bale 24 in FIGS. 6 and 7.

The frame 11, wheels and axles 12 and 12', hinge 13, bale stop 15, roller 16 and bale guides 17 are of conventional construction in the big bale stacker industry. The backward tip of load bed 14 at hinge 13 may be made with a conventional hydraulic ram (not shown), for example.

Load bed 14 is preferably a flat, smooth metal bed, wide enough to accommodate the longest dimension of a large hay bale, and long enough to accommodate 3–10 two-bale sets when fully loaded. Load bed 14 has bale-set moving mechanism 18 in, on, or under it. Bale-set moving mechanism 18 must move far enough rearwardly in order to displace a two-bale set at least the depth of a set. This way, enough room is left at the front edge of the load bed, after displacement of a set, for the load bed to receive another set.

Pivotal bed-table connection 20, and pivotable table-pick-up connection 22 may also be of conventional construction. The rotation of the load table 21 and of the pick-up mechanism 23 may be made with conventional hydraulic rams (also not shown), for example.

Pick-up mechanism 23 may be a squeeze-type mechanism, for example, with the squeeze-arms again being operated by conventional hydraulic rams (also not shown).

In use, the stacker operates by stacking a two-bale-high set of big hay bales at the front of the load bed, pushing each two-bale set back far enough to allow another two-bale set to be stacked at the load bed front edge, and then repeating the process until the load bed is full and ready for tipping back to unload the series of two-bale sets onto the ground. First, the stacker approaches a first hay bale on the ground in the direction of the travel of the stacker. The pick-up mechanism picks up said first hay bale across its longest dimension, rotates the first bale preferably 90° about a horizontal axis perpendicular to the direction of travel, and places the first bale on the front edge of a load table perpendicular to the length of the load table. Then, the load table rotates upwardly and backwardly about a horizontal axis perpendicular to the direction of travel, the horizontal axis being at a rear edge of said load table. The pick-up mechanism releases said first bale, either before the load table rotates or after the load table rotates, so that the first bale is released to slide down to rest on the front edge of the load bed and perpendicular to the length of the load bed.

The stacker then stacks a second bale on top of the first bale to create a two-bale set on the load bed. This is done preferably by the following steps: approaching a second hay bale on the ground in the stacker's direction of travel, picking up said second hay bale across its longest dimension, rotating the second bale about 90° about a horizontal axis perpendicular to the direction of travel, and placing the second bale on a front edge of said load table with said pick-up mechanism. Then, the load table is rotated upwardly and backwardly about its horizontal axis perpendicular to the direction of travel (said axis being at the rear edge of said load table) until said second bale is placed on top of said first bale on the front of a load bed. Alternatively, after the second bale is picked up by the pick-up mechanism, the load table may first rotate 90° to lift the second bale in the pick-up mechanism upwards, and then the pick-up mechanism may rotate 90° to place the second bale directly over the first bale. In either case, once the second bale is directly over the first bale, the pick-up mechanism releases the second bale, so that the second bale rests on top of and generally aligned with the first bale.

Once the two-bale set is stacked on the load bed front edge, the first and second bales are moved together as a set rearwardly toward the back of the load bed to make room for the next two-bale set. Once the load bed is full, the load bed may be tipped backwards to unload the series of two-bale sets to form a stack on the ground.

Although this invention has been described above with reference to particular means, materials and embodiments, it is to be understood that the invention is not limited to these disclosed particulars, but extends instead to all equivalents within the scope of the following claims.

What is claimed is:

1. A hay bale stacker for hay bales having a height, a length and a width, said length being the hay bales' longest dimension, said hay bale stacker having a direction of travel, and comprising:

a pick-up mechanism which lifts a hay bale across the length of the hay bale and rotates the bale 90° about a horizontal axis parallel to said bale length and perpendicular to the stacker direction of travel;

a load table with a front end and a back end, said load table being pivotally connected at its front end to said pick-up mechanism, said load table being rotatable 90° only at its back end about a horizontal axis parallel to said bale length and perpendicular to the stacker direction of travel, and said load table being adapted to receive said hay bale from said pick-up mechanism;

a load bed with a front end and a back end, said load bed being pivotally connected at its front end to said load table, said load bed having a bale-set moving mechanism which moves from near the front end of said load bed towards the back end, and said load bed being adapted to receive a vertically stacked set of two hay bales from said load table and from said pick-up mechanism; and a frame pivotally connected to said load bed, so that said load bed may be tipped backwards relative to the said frame to discharge a said vertically stacked set of two hay bales, wherein the load table rotates about a horizontal axis in the plane of said load bed from coplanar with to perpendicular to and above the load bed.

* * * * *